US010529036B2

(12) United States Patent
Xu et al.

(10) Patent No.: US 10,529,036 B2
(45) Date of Patent: Jan. 7, 2020

(54) FORECASTING NATIONAL CROP YIELD DURING THE GROWING SEASON USING WEATHER INDICES

(71) Applicant: The Climate Corporation, San Francisco, CA (US)

(72) Inventors: Lijuan Xu, Foster City, CA (US); Ying Xu, Boston, MA (US)

(73) Assignee: The Climate Corporation, San Francisco, CA (US)

( * ) Notice: Subject to any disclaimer, the term of this patent is extended or adjusted under 35 U.S.C. 154(b) by 911 days.

(21) Appl. No.: 15/004,820

(22) Filed: Jan. 22, 2016

(65) Prior Publication Data

US 2017/0213141 A1 Jul. 27, 2017

(51) Int. Cl.
*G06N 7/00* (2006.01)
*G06F 17/30* (2006.01)
*G06Q 50/02* (2012.01)

(52) U.S. Cl.
CPC .................. *G06Q 50/02* (2013.01)

(58) Field of Classification Search
None
See application file for complete search history.

(56) References Cited

U.S. PATENT DOCUMENTS

| 7,702,597 | B2 | 4/2010 | Singh et al. | |
|---|---|---|---|---|
| 9,563,848 | B1 * | 2/2017 | Hunt | G06N 5/045 |
| 2015/0370935 | A1 | 12/2015 | Starr | |

FOREIGN PATENT DOCUMENTS

| WO | WO 2017/096073 A1 | 6/2017 |
|---|---|---|
| WO | WO 2017/119987 A1 | 7/2017 |

OTHER PUBLICATIONS

International Searching Authority, "Search Report" in application No. PCT/US17/13308, dated Apr. 4, 2017, 16 pages.
Current Claims in application No. PCT/US17/13308, dated Apr. 2017, 8 pages.
European Patent Office, "Search Report" in application No. 17741786. 2-1222, dated May 8, 2019, 8 pages.
European Claims in application No. 17741786.2-1222, dated May 2019, 6 pages.

* cited by examiner

*Primary Examiner* — Robert K Carpenter
(74) *Attorney, Agent, or Firm* — Hickman Palermo Becker Bingham LLP; Sanjeev Bajwa

(57) ABSTRACT

A method for determining national crop yields during the growing season may be accomplished using a system that receives agricultural data records that are used to forecast a national crop yield for a particular year. Weather index values are calculated and aggregated from the agricultural data records. Crop yield estimating instructions select representative features from aggregated weather index data and create a covariate matrix for each specific geographic area. Linear regression instructions calculate the crop yield for the specific geographic area for the specific year using the corresponding covariate matrix for that specific year. The crop estimating instructions determine a national crop yield for the specific year using the sum of the crop yields for the specific geographic areas for the specific year nationally adjusted using national yield adjustment instructions. In an embodiment, the crop yield may refer to a specific crop yield such as corn yield.

28 Claims, 10 Drawing Sheets

Fig. 2
(a)
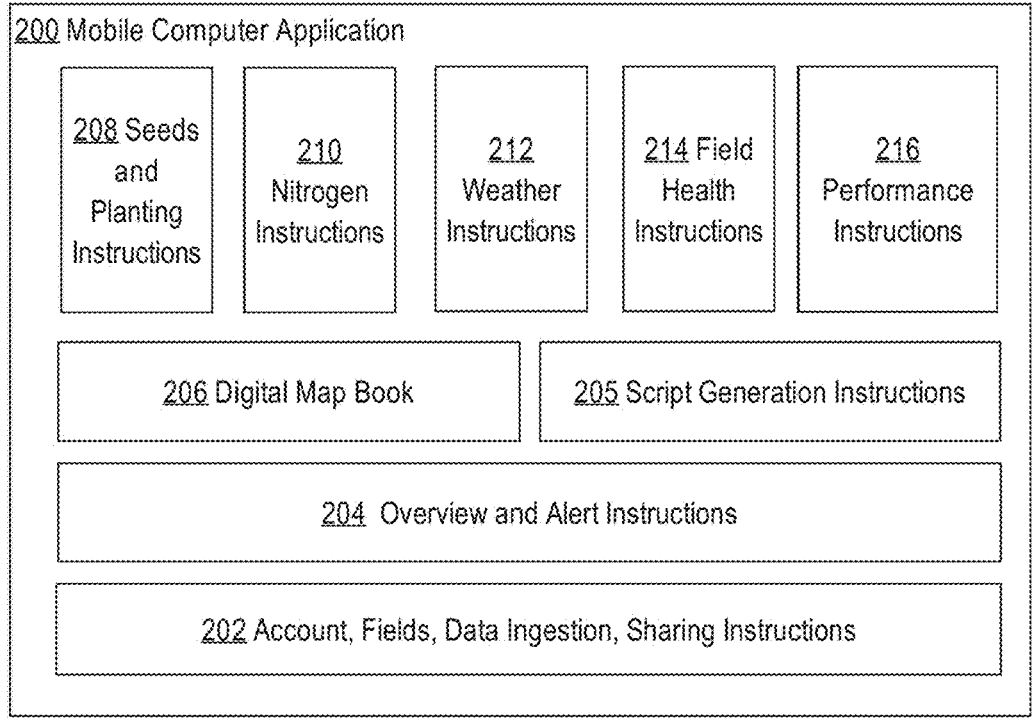
(b)
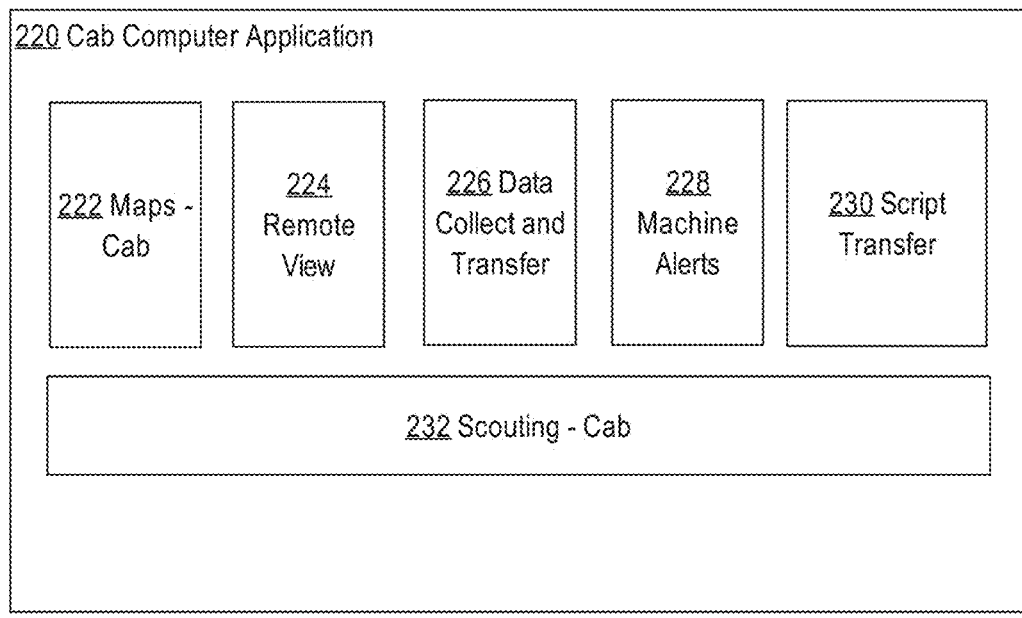

FIG. 8

GDD cut off values for corn

| Stage | V2 | V4 | V6 | V8 | V10 | V12 | V14 | V16 | R1 | R2 | R3 | R4 | R5 | R5.5 | R6 |
|---|---|---|---|---|---|---|---|---|---|---|---|---|---|---|---|
| GDD | 177 | 306 | 421 | 540 | 655 | 771 | 886 | 1005 | 1240 | 1526 | 1818 | 2120 | 2281 | 2499 | 2700 |

FIG. 10

FORECASTING NATIONAL CROP YIELD DURING THE GROWING SEASON USING WEATHER INDICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure relates to computer systems and computer-implemented methods that are configured for generating data values that are useful in forecasting an agricultural crop yield for an entire country or other large region, during a growing season, based on local data measurements over a specific time period.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Agricultural production requires significant strategy and analysis. In many cases, agricultural growers, such as farmers or others involved in agricultural cultivation, are required to analyze a variety of data to make strategic decisions before and during the crop cultivation period. In making such strategic decisions, growers rely on computer-implemented crop yield forecast models to determine their cultivation strategy. Crop yield forecast models may help a grower decide how to spend or conserve in key areas that affect cultivation, such as fuel and resource costs, equipment investments, crop related insurance, and crop cultivation manpower.

Crop yield forecast models also are commonly used by insurance companies and risk management companies to calculate premiums based upon certain risk factors. For example, crop revenue insurance is an insurance policy that protects a farmer's projected crop revenue for a given year and covers a decline in price that occurs during the crop growing season. Such crop revenue coverage is based on determining a deviation from the mean projected revenue of the crop. For insurance companies to create profitable crop revenue insurance plans, the insurance companies must have accurate crop yield forecast models to accurately estimate the revenue of a farmer.

However, most measurements of crop production occur at the end of a growing season, and are prepared on a local or regional basis. In a large geographical region such as the United States, obtaining accurate crop yield forecasts at the national level, and during the growing season, has been a challenge for farmers and insurance companies. Local and regional measurements are numerous and prepared in widely geographically distributed areas, and are difficult to obtain when farmers are in the growing season and occupied by other critical growing tasks. Consequently, one of the challenges in creating an accurate crop yield forecast model is simply obtaining data useful to create a national crop yield forecast model during the growing season. One approach has been to use data provided by the United States Department of Agriculture's National Agricultural Statistics Service (NASS). NASS conducts a survey-based data collection technique, where it conducts an agricultural yield survey multiple times during a year. The survey is provided directly to farmers across the country and asks the farmers to report their crop conditions at that time of year. However, this approach is not particularly useful for forecasting during the growing season because farmers are unable to provide a good estimate of their crop yield until harvest time approaches, at the end of the growing season.

Other approaches for predicting accurate crop yields during the growing season may involve using crop simulation process models, for example, to predict regional corn yields. The drawbacks to this approach are that process models require a multitude of local inputs including weather and climate conditions, soil conditions, and data points covering a large set of farming regions. These inputs then need to be calibrated in order to be accurate. The cost for collecting a high number of local inputs and calibrating the parameters make process modelling too expensive to feasibly use at a national level.

Methods for analyzing a limited number of crop related data during the growing season and modelling crop yields at a national level are desirable.

BRIEF DESCRIPTION OF THE DRAWINGS

In the drawings:

FIG. 2 illustrates two views of an example logical organization of sets of instructions in main memory when an example mobile application is loaded for execution.

FIG. 8 illustrates an example chart where growing degree days define the start different phenological development stages.

FIG. 10 depicts an example embodiment of a spreadsheet view for data entry.

DETAILED DESCRIPTION

Figure 1:
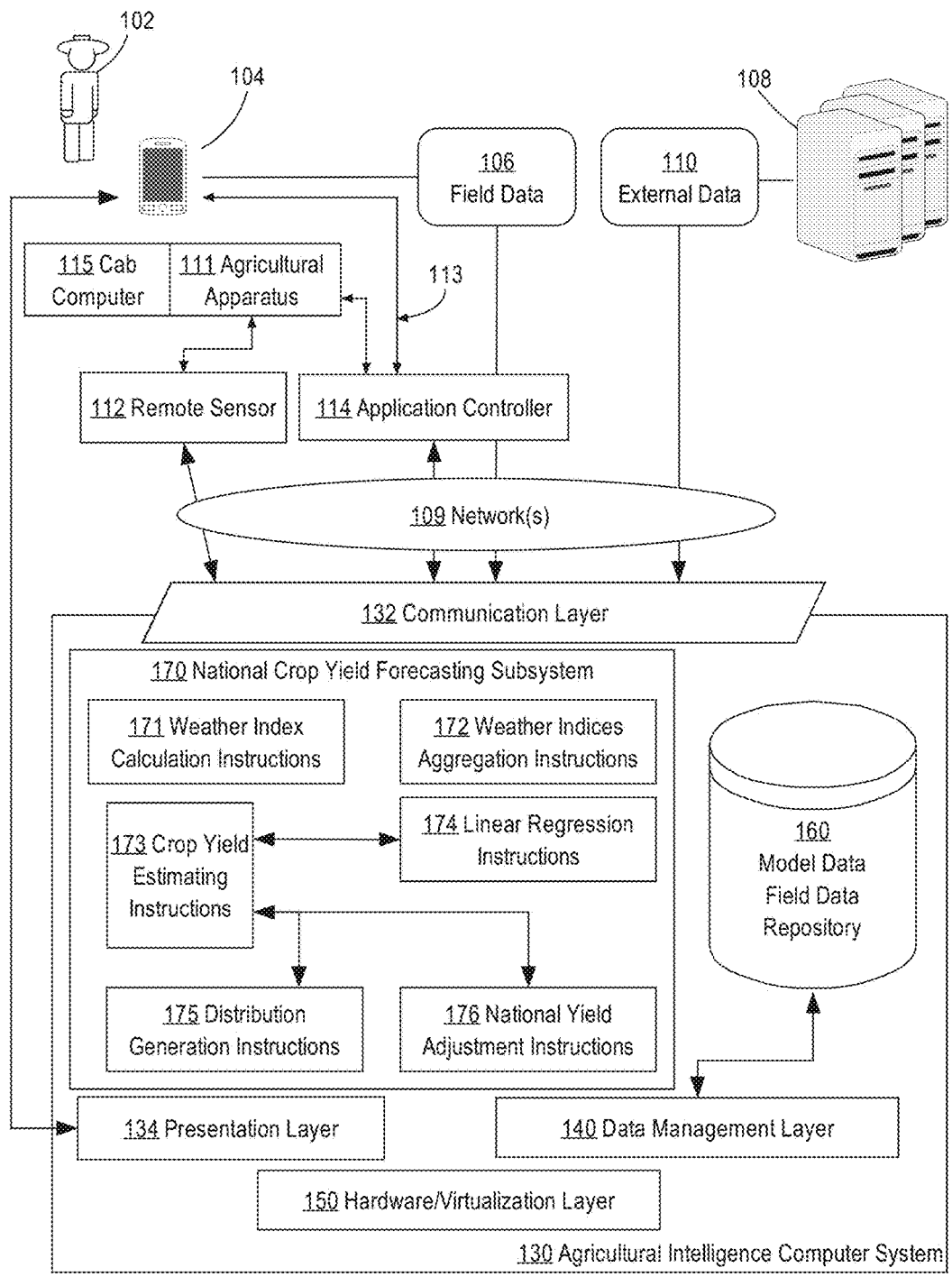
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. For purposes of clarity and conciseness, in some instances this disclosure refers to certain data values, which are stored and used in electronic digital form in memory or non-volatile storage, using labels that represent concepts or abstractions and also specifies certain mathematical expressions or equations. However, each instance in this detailed description of using or referring to an abstract item or concept is intended to encompass one or more electronically digitally stored instructions or data values that represent or correspond to the specified abstract item or concept. In other words, the disclosure is directed to practical applications of the concepts described herein using the particular computers, computer memory, computer storage, and computer communications that are described herein, and is not intended to encompass all means of implementing the abstract items or concepts nor to encompass the abstract items or concepts themselves. Embodiments are disclosed in sections according to the following outline:

1. GENERAL OVERVIEW
2. EXAMPLE AGRICULTURAL INTELLIGENCE COMPUTER SYSTEM
    2.1. STRUCTURAL OVERVIEW
    2.2. APPLICATION PROGRAM OVERVIEW
    2.3. DATA INGEST TO THE COMPUTER SYSTEM
    2.4. PROCESS OVERVIEW—AGRONOMIC MODEL TRAINING
    2.5. NATIONAL CROP YIELD FORECASTING SUBSYSTEM
    2.6. IMPLEMENTATION EXAMPLE—HARDWARE OVERVIEW
3. FUNCTIONAL OVERVIEW—NATIONAL CROP YIELD FORECASTING DURING A GROWING SEASON
    3.1. RECEIVING DATA AND CALCULATING WEATHER INDICES
    3.2. AGGREGATING WEATHER INDICES
    3.3. DETERMINING CROP YIELD FOR GEOGRAPHIC AREA
    3.4. DETERMINING NATIONAL CROP YIELD
4. WEATHER INDICES
    4.1. CROP PHENOLOGY
    4.2. FLOOD STRESS
    4.3. DROUGHT STRESS
    4.4. EARLY DROUGHT STRESS
    4.5. DAYTIME HEAT STRESS
    4.6. NIGHTTIME HEAT STRESS
5. BENEFITS OF CERTAIN EMBODIMENTS
6. EXTENSIONS AND ALTERNATIVES

1. General Overview

A computer system and computer-implemented method are provided, and are configured for determining national crop yields during the growing season using regional agricultural data. "National," in this context, means in relation to a country, state in the international sense of a state, or other large region. In an embodiment, determining national crop yields during the growing season may be accomplished using a server computer system that receives, via a network, agricultural data records that are used to forecast a national crop yield for a particular year. Within the server computer system weather index calculation instructions receive one or more agricultural data records that represent observed agricultural data points for a specific geo-location at a specific time. The observed agricultural data points include, but are not limited to, observed temperature records, soil moisture records, and precipitation records for the specific geo-location. The weather index calculation instructions then calculate one or more weather index values from the one or more agricultural data records. Weather index values represent crop stress that may affect the crop yield of particular plants. The weather index values are then compiled into one or more geo-specific weather indices for one or more geo-locations over a specified period of time. Each of the geo-specific weather indices may contain weather index values representing various types of stress events on crop including, but not limited to, flood stress, drought stress, early drought stress, daytime heat stress, and nighttime heat stress.

Within the server computer system, weather indices aggregation instructions aggregate the one or more geo-specific weather indices to create one or more aggregated weather index data series, where each aggregated weather index data series contains weather index values for a specific calculated weather index for one or more specific geo-locations. Each weather index data series represents a specific geographic area from a subset of the one or more geo-specific weather indices.

Crop yield estimating instructions, in the server computer system, then select representative features from each aggregated weather index data series within each of the one or more aggregated weather index data series.

The crop yield estimating instructions then creates a covariate matrix for each specific geographic area in computer memory of the server computer system. The covariate matrix contains the representative features selected from the one or more aggregate weather index data series. In the case of a nation that is organized as a federation of states, the crop yield estimating instructions then determine crop yield for a specific year for the specific geographic area, where the specific geographic area may represent a specific state within the nation; in other embodiments, the specific geographic area may represent another kind of political unit that is relevant to a different nation, such as a parish, county, commune, shire and the like. The crop yield for the specific geographic area for the specific year is calculated using linear regression instructions to calculate the specific geographic area crop yield from the covariate matrix that represents the specific geographic area for that specific year. The parameters of the linear regression instructions include regression parameters that are calculated using distribution generation instructions and an error term that is calculated using the distribution generation instructions where a mean parameter for the error term is zero and the variance parameter is a geographic area specific bias coefficient.

After determining crop yields for the specific geographic area representing the one or more aggregated weather index data series, the crop estimating instructions determine a national crop yield for the specific year by using the distribution generation instructions to calculate the national crop yield for a specific year from the sum of the crop yields for the specific geographic areas for the specific year nationally adjusted using national yield adjustment instructions. In an embodiment, the crop yield may refer to a specific crop yield such as corn yield.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of that might otherwise be obtained from third party sources, such as weather data. In some embodiments, an external data server 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 9:
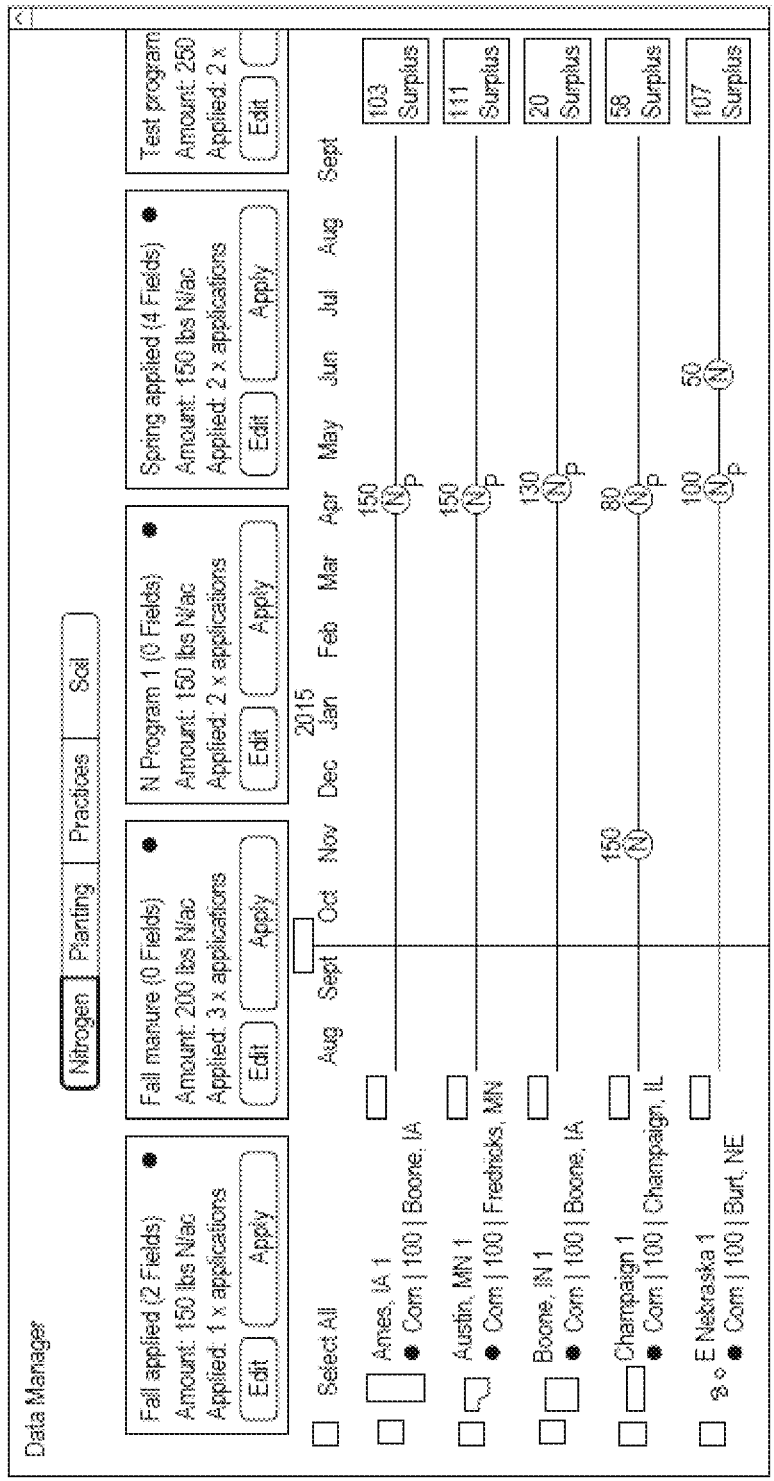
FIG. 9 depicts an example embodiment of a timeline view for data entry.

FIG. 9 depicts an example embodiment of a timeline view for data entry. Using the display depicted in FIG. 9, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 9, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 9, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 9, the interface may update to indicate that the "Fall applied" program is no longer being applied to the top field.

While the nitrogen application in early April may remain, updates to the "Fall applied" program would not alter the April application of nitrogen.

Figure 10:
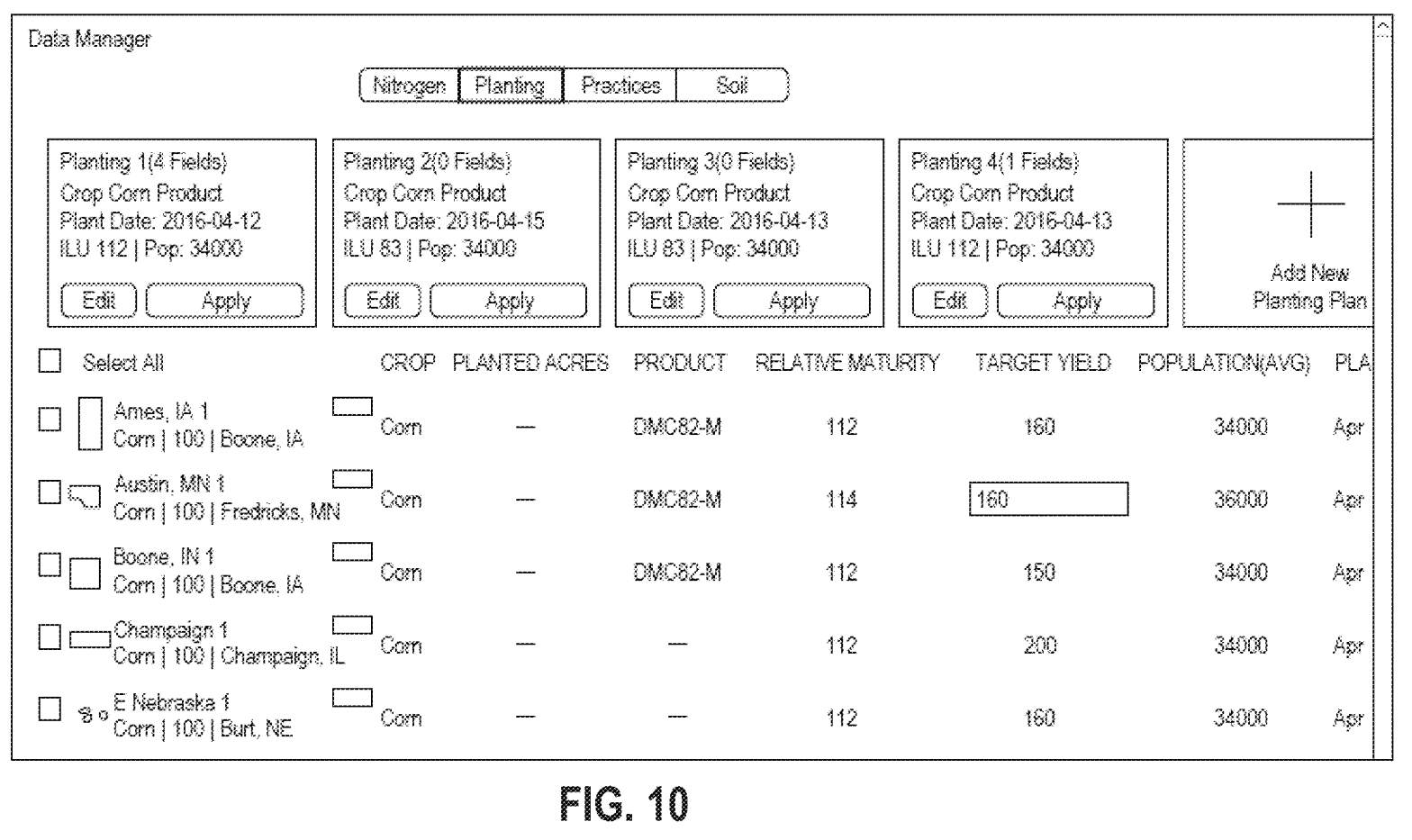

FIG. 10 depicts an example embodiment of a spreadsheet view for data entry. Using the display depicted in FIG. 10, a user can create and edit information for one or more fields. The data manager may include spreadsheets for inputting information with respect to Nitrogen, Planting, Practices, and Soil as depicted in FIG. 10. To edit a particular entry, a user computer may select the particular entry in the spreadsheet and update the values. For example, FIG. 10 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
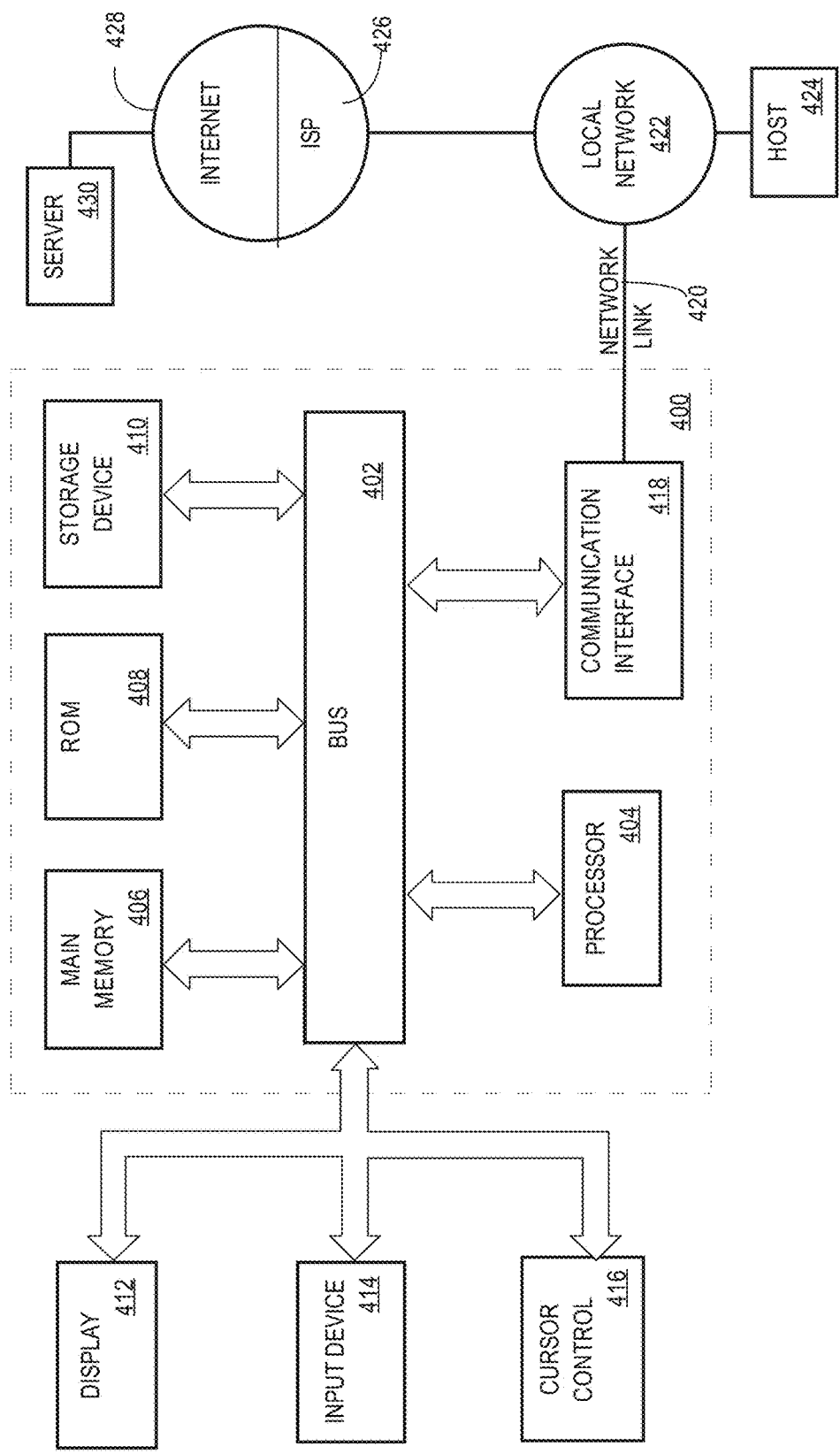
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into soil zones along with a panel identifying each soil zone and a soil name, texture, and drainage for each zone. Mobile computer application 200 may also display tools for editing or creating such, such as graphical tools for drawing soil zones over a map of one or more fields. Planting procedures may be applied to all soil zones or different planting procedures may be applied to different subsets of soil zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
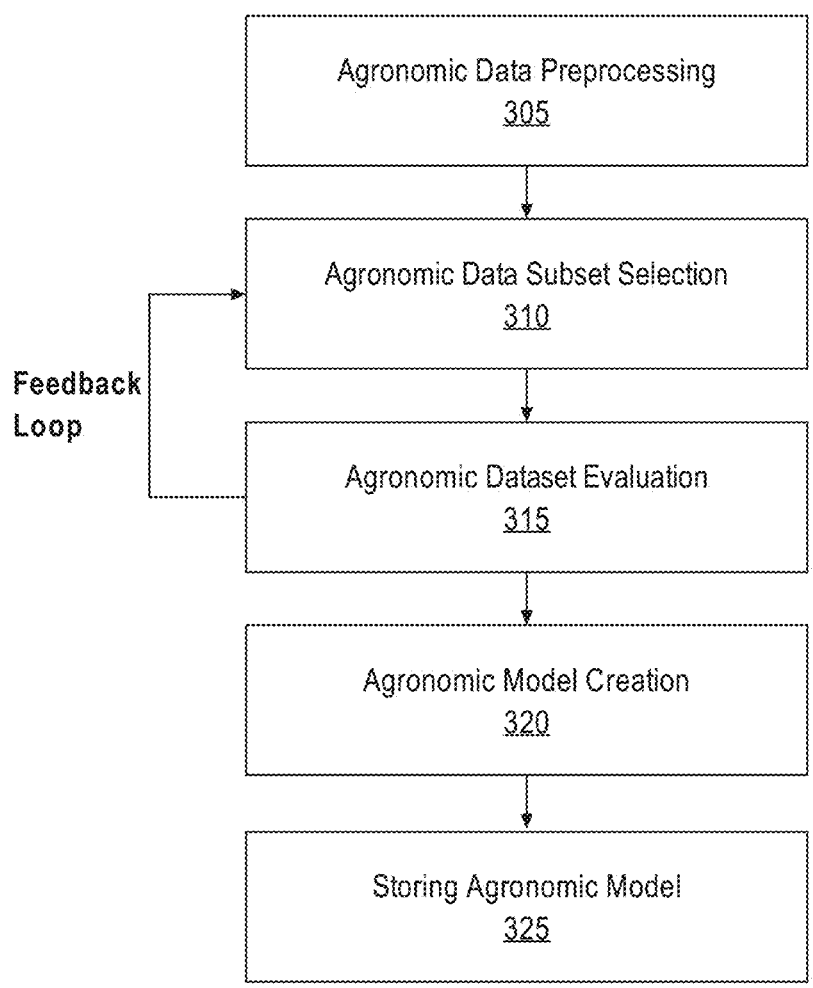
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. National Crop Yield Forecasting Subsystem

In an embodiment, the agricultural intelligence computer system 130, among other components, includes a national crop yield forecasting subsystem 170. The national crop yield forecasting subsystem 170 is configured to predict national crop yield for a given year based on calculated covariate data points up to a specific observation date. Covariate data refers to independent variables that may be used in forecasting crop yields. In this context, the covariate data refers to calculated weather index values derived from different agricultural data records that are related to observed environmental conditions or soil information related to the composition of farmland soil and the water saturation level of farmland soil. Calculated weather index values describe and quantify extreme weather events that may impact crop growth and crop yield. In an embodiment, agricultural data records from field data 106 and external data 110 are used to calculate multiple weather indices. Agricultural data records may include, but are not limited to, daily agricultural data related to temperature, precipitation and soil moisture data.

In an embodiment, the national crop yield forecasting subsystem 170 contains specially configured logic including, but not limited to, weather index calculation instructions 171, weather indices aggregation instructions 172, crop yield estimating instructions 173, linear regression instructions 174, distribution generation instructions 175, and national yield adjustment instructions 176. Each of the foregoing elements is further described in structure and function in other sections herein. Each of the elements comprise executable instructions loaded into a set of one or more pages of main memory, such as RAM, in the agricultural intelligence computer system 130 which when executed cause the agricultural intelligence computer system 130 to perform the functions or operations that are described herein with reference to those modules. For example, the weather index calculation instructions 171 may comprise executable instructions loaded into a set of pages in RAM that contain instructions which when executed cause performing the weather index calculation functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the weather index calculation instructions 171, weather indices aggregation instructions 172, crop yield estimating instructions 173, linear regression instructions 174, distribution generation instructions 175, and national yield adjustment instructions 176 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system 130 to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

The weather index calculation instructions 171 provide instructions to receive multiple agricultural data records and calculate weather index values that represent one or more types of weather indices for one or more fields represented by the multiple agricultural data records. The weather indices aggregation instructions 172 provide instructions to generate a set of aggregated weather indices that represent sets of weather indices for a specific geographic area. A specific geographic area may be made up of one or more measured fields. The crop yield estimating instructions 173 provide instructions to create covariate matrices for each aggregated weather index. The crop yield estimating instructions 173 provide instructions to determine crop yield for a defined geographic area based on the created covariate matrices. The crop yield estimating instructions 173 provide instructions to communicate with the linear regression instructions 174, the distribution generation instructions 175, and the national yield adjustment instructions 176. The linear regression instructions 174 provide instructions to determine the crop yield for a specific geographic area using a linear regression function on the covariate matrix for that particular geographic area. The distribution generation instructions 175 provide instructions to determine specific distribution values for the particular geographic area. The national yield adjustment instructions 176 provide instruction to calculate bias and error coefficients that may be associated with incomplete sampling of yields for geographic areas. The crop yield estimating instructions 173 provide further instructions to use the calculated bias and error coefficients provided by the national yield adjustment instructions 176 to calculate a national crop yield for a particular year based upon the calculated crop yields from the defined geographic areas.

2.6. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Figure 5:
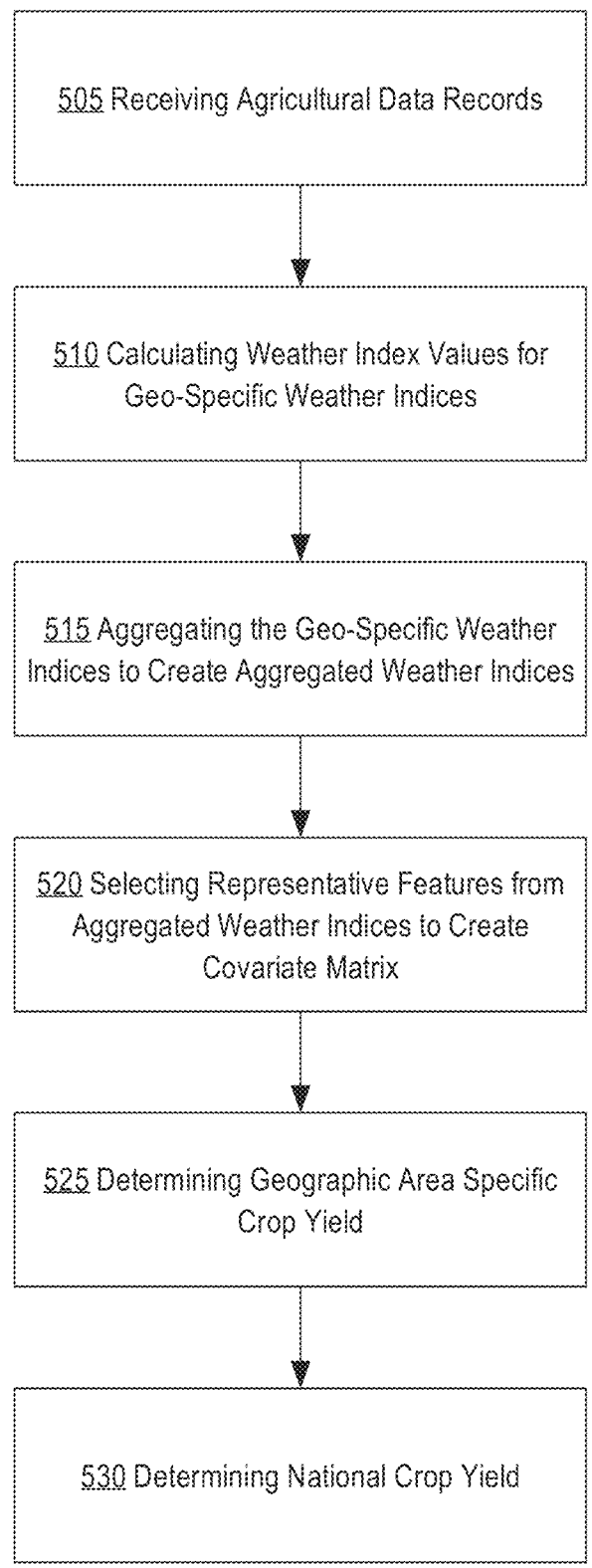
FIG. 5 is a flow diagram that depicts a process for determining a national crop yield for a specified year.

3. Functional Overview—National Crop Yield Forecasting During a Growing Season FIG. 5 is a flow diagram that depicts a process for determining a national crop yield for a specified year using calculated covariate data points at a more granular level. FIG. 5 may be implemented, in one embodiment, by programming the elements of the agricultural intelligence computer system 130 to perform the functions that are described in this section, which may represent disclosure of an algorithm for computer implementation of the functions that are described. For purposes of illustrating a clear example, FIG. 5 is described in connection with certain elements of FIG. 1. However, other embodiments of FIG. 5 may be practiced in many other contexts and references herein to units of FIG. 1 are merely examples that are not intended to limit the broader scope of FIG. 5.

3.1 Weather Index Calculation Instructions

At step 505, external data 110 is received by the agricultural intelligence computer system 130. For example, the communication layer 132 of the agricultural intelligence computer system 130 may receive external data 110 from the external data server computer 108. External data 110 may include, but is not limited to, daily observed temperatures, daily precipitation, and daily soil moisture.

In an embodiment, external data 110 is received by the communication layer 132 and then stored in the model and field data repository 160 to be used by the weather index calculation instructions 171. In an embodiment, storage of external data 110 may be organized and stored as a time series based upon fields, CLUs, or other geo-specific designation. "Time series," in this disclosure, refers to digital data that may be electronically stored in main memory or in digital electronic storage devices associated with the agricultural intelligence computer system 130 and comprises a collection of data values that represent a specific area over multiple time periods. For example, a maximum temperature time series may contain daily maximum temperature values for a measured field over a specific time period. Other compiled field specific time series may include daily precipitation, daily water runoff, daily soil moisture values, or other temperature data such as daily minimum temperature.

At step 510, weather index calculation instructions 171 provide instruction to calculate weather indices based on the different field specific time series compiled in step 505. In an embodiment, a particular weather index represents the amount of stress incurred on crop over a defined period within the plant's lifecycle. A weather index is used to quantify extreme weather events such as, high or low temperatures, heavy precipitation or drought, or soil moisture that may cause stress to crop growth and may negatively affect optimal crop yield.

In an embodiment, weather index may be calculated as a summation of daily weather values that exceed a specified threshold over a particular time period. Time periods may be measured by one or more stages that describe crop phenology for a plant species. Crop phenology is the study of the life cycle of a plant species from planting to harvest. In an embodiment, the crop phenology may be divided into different stages, each identifying a particular period in the plant's growth. When calculating a weather index, only observed weather events that are identified as extreme weather are considered. A particular threshold value for daily weather measurements may be used to determine if the daily weather measurement is extreme. For example, if a daily weather measurement exceeds the particular threshold value, then the daily weather measurement is considered extreme and is used in the weather index calculation.

In an embodiment, the weather index calculation instructions 171 provide instruction to calculate weather indices for weather events including, but not limited to, flood stress, drought stress, early drought stress, daytime heat stress, and nighttime heat stress. In another embodiment, the weather index calculation instructions 171 may provide instructions to calculate weather indices that focus on specific stages within the crop phenology. For example, the weather index calculation instructions 171 may calculate a drought stress value for stages one and two, where stage one drought stress includes daily weather measurements from vegetative stage 8 through vegetative stage 16 of the phenology lifecycle and stage two drought stress includes daily weather measurements from reproductive stage one through two of the phenology lifecycle. The calculation of weather indices and the corn phenology model are described in detail in the WEATHER INDICES section herein.

3.2 Aggregating Weather Indices Instructions

At step 515, weather indices aggregation instructions 172 cause creating one or more aggregated weather indices, each of which represents a specific geographic area. For example, a geographic area may be defined as a crop producing state such as Iowa. In this case, the aggregating weather indices instructions 172 would include instructions to take every geo-specific weather index representing a geo-location within the boundary of Iowa and aggregate them to create a single weather index data series for that specific type of weather index. For example, the aggregated weather indices for Iowa include weather index data series: flood stress (stage one), drought stress (stages one, two and three), early drought stress (stage one), daytime heat stress (stages one, two, and three), and nighttime heat stress (stage one).

3.3. Determining Crop Yield for Geographic Area

At step 520, the crop yield estimating instructions 173 cause selecting a representative feature that represents each of the multiple aggregated weather indices. Modeling yield for a geographic area using all of the data points within the multiple aggregated weather indices is computationally expensive; therefore, in one embodiment, a representative feature that represents each aggregated weather index may be used. In an embodiment, median values for each aggregated weather index are calculated and used to represent each aggregated weather index for the geographic area. In another embodiment, the mean value for each weather index may be used to represent each aggregated weather index. In yet other embodiments, other representative features may be calculated from each aggregated weather index to represent the specific weather indices.

In an embodiment, the crop yield estimating instructions 173 provide instructions to create a covariate matrix for each defined geographic area made up of the selected representative features previously determined from the multiple aggregated weather indices. Each covariate matrix created using this approach comprises a set of digital data that is electronically stored within the model and field data repository 160. For instance, the covariate matrix for the geographic area that represents the state of Iowa will consist of median values for each type of weather index determined from the multiple measured fields within Iowa.

At step 525, a crop yield for a specific geographic area is determined. The crop yield estimating instructions 173 cause determining a crop yield for a specific geographic area by requesting the linear regression instructions 174 to determine a predicted crop yield using the created covariate matrix for that specific geographic area. The linear regression instructions 174 cause determining a predicted crop yield by creating a linear regression model. Linear regression is an approach for modeling the relationship between a dependent variable and independent variables. In this context, the dependent variable is the crop yield for the specific geographic area, and the one or more independent variables are the covariate values in the covariate matrix. The linear regression model assumes that the relationship between the dependent variable and the one or more independent variables is linear. This relationship is modeled through an error term $\varepsilon$, which is an unobserved random variable. Statistical estimation is incorporated using a regression coefficient, $\beta$.

In an embodiment, the linear regression instructions 174 provide instruction to determine the crop yield for a geographic area for a specific year using logic that implements the following function:

$$Y_{s,t} = \begin{pmatrix} 1 \\ X_{s,t} \end{pmatrix}^T \beta_s + \varepsilon_{s,t}$$

Where:
$Y_{s,t}$: equals the yield for geographic area S for a given year t.

$\begin{pmatrix} 1 \\ X_{s,t} \end{pmatrix}^T$:

equals the transpose of the covariate matrix of geographic area S in year t up to an observational date.

$\beta_s$: equals the regression coefficient for geographic area S.
$\varepsilon_{s,t}$: equals the error term for geographic area S in year t.

In order for the linear regression instructions 174 to determine the crop yield for the geographic area, it first determines the $\beta$ regression coefficient and $\varepsilon$ error term.

For example, the distribution generation instructions 175 may be programmed to determine the $\beta$ regression coefficient and $\varepsilon$ error term for a given state for a given year. The linear regression instructions 174 requests distribution generation instructions 175 to return the $\beta$ regression coefficient and $\varepsilon$ error term for the given geographic area and year. In an embodiment, the distribution generation instructions 175 may use historical data to determine the $\beta$ regression coefficient and $\varepsilon$ error term. The distribution generation instructions 175 is programmed to determine the $\beta$ regression coefficient and $\varepsilon$ error term by using an independently and identically distributed random variable from a normal distribution function as illustrated below.

$$\beta_s \sim^{i.i.d} N(\beta_0, \Sigma_0)$$

$$\varepsilon_{s,t} \sim^{i.i.d} N(0, \sigma^2)$$

A normal distribution is a function that represents the distribution of many random variables as a symmetrical bell-shaped graph. It is denoted by the function $N(\mu, \sigma)$, where $\mu$ represents the mean or expectation of the distribution and $\sigma^2$ represents the variance. In this case the normal distribution functions are independently and identically distributed random variables, so that each random variable has the same probability distribution as the others and all random variables are mutually independent.

In an embodiment, depending on when the forecast is initiated, the distribution generation instructions 175 may determine a uniform regression coefficient or a varying regression coefficient. A uniform coefficient means that the distribution generation instructions 175 determines the $\beta$ regression coefficient using historical data from all available geographic areas and creates a single $\beta$ regression coefficient value to be used to determine the crop yield for all geographic areas. Such that $\beta_{s1} = \beta_{s2} = \beta_{sn}$, for all geographic areas {s1, s2 . . . sn}. A varying coefficient means that the distribution generation instructions 175 determines specific $\beta$ regression coefficient values for each specific geographic area using historical data from that specific geographic area. For example, the distribution generation instructions 175 may use historical data that is specific to the geographic region S to determine the $\beta_s$ regression coefficient for the specific geographic area.

In an embodiment, when calculating a uniform $\beta$ regression coefficient, the distribution generation instructions 175 may use historical data from multiple geographic areas to determine the $\beta$ regression coefficient to be used by all geographic areas. The purpose of using multiple geographic areas is if early season data does not contain enough data signals in the dataset for each region to calculate a $\beta_s$ regression coefficient separately, then it is beneficial to combine the early season data into a single dataset and calculate a uniform $\beta$ regression coefficient may be used to provide accurate crop yield results.

In an embodiment, the distribution generation instructions 175 may provide a historical data observation date that may be used to determine whether the distribution generation instructions 175 use historical data that is specific to one geographic area or historical data from multiple geographic areas. In an embodiment, the historical data observation date value may be configured by the distribution generation instructions 175.

Figure 6:
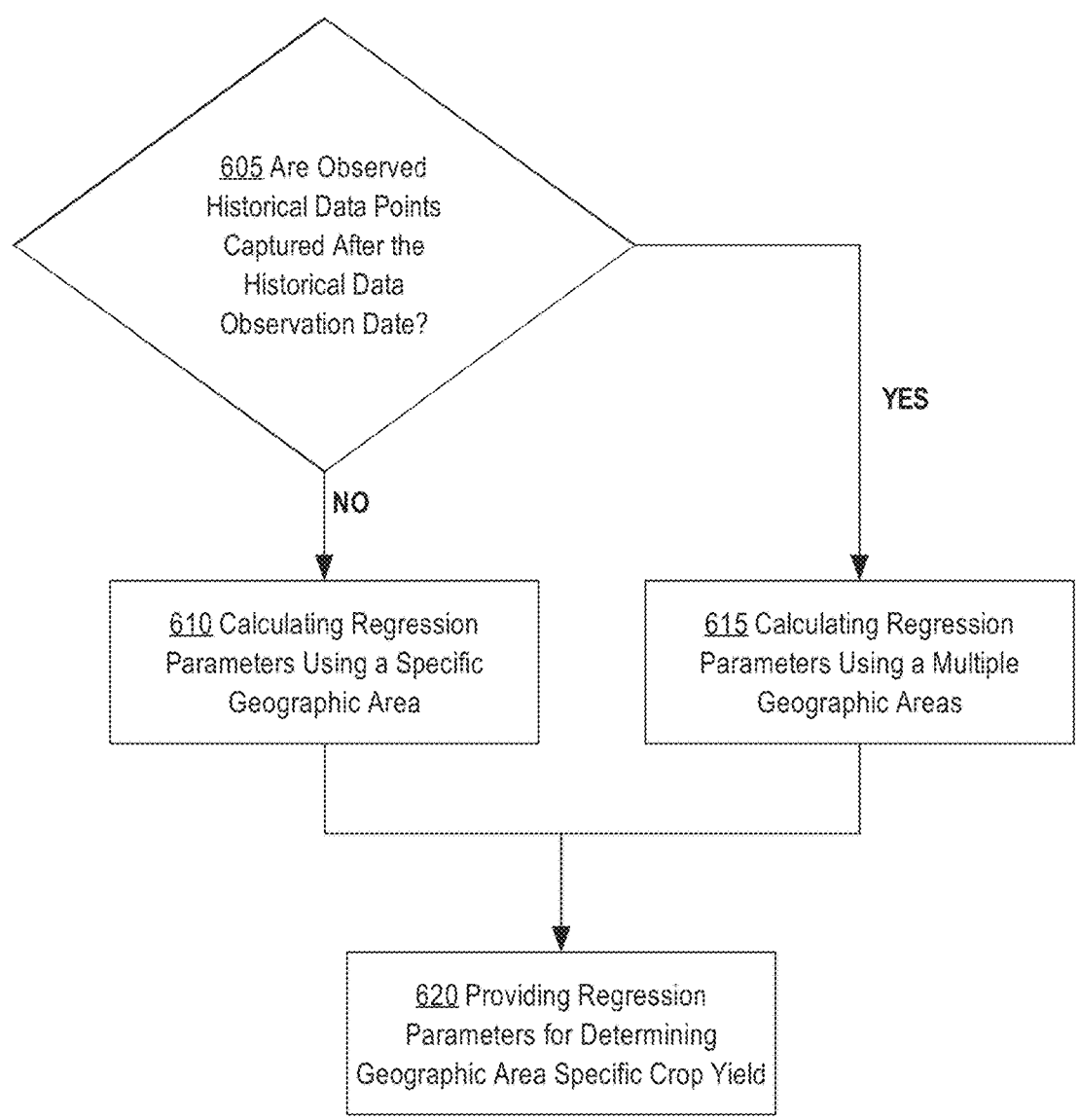
FIG. 6 depicts the process of determining whether uniform regression parameters or varying regression parameters are calculated.

FIG. 6 depicts an example process of determining whether uniform regression parameters or varying regression parameters are calculated. At step 605, the distribution generation instructions 175 determine whether historical data received includes data that was captured after a historical data cutoff date. The historical data cutoff date is an observation date that is configured to determine whether to use a uniform β regression coefficient or a varying $β_s$ regression coefficient. For example, if the historical data cutoff date is set to July 15$^{th}$ of the current year, then if the national crop yield forecast is performed before the historical data cutoff date, then the distribution generation instructions 175 will use historical data provided from multiple geographic areas in order to determine an accurate uniform β regression coefficient. If however, the national crop yield forecast is performed after the historical data cutoff date, then distribution generation instructions 175 may determine the varying $β_s$ regression coefficient using only historical data for the geographic area of interest.

Step 610 depicts a scenario where historical data received was captured on or before the historical data observation date of July 15$^{th}$. In this scenario, the distribution generation instructions 175 calculate a uniform β regression coefficient from historical data from all available geographic areas.

Step 615 depicts a scenario where historical data received includes data captured after the historical data observation date of July 15$^{th}$. In this scenario, the distribution generation instructions 175 calculate a varying $β_s$ regression coefficient using only historical data for the geographic area of interest.

Step 620 depicts the distribution generation instructions 175 providing the determined β regression coefficient, either the uniform or varying coefficient, and ε error term values to the linear regression instructions 174.

In an embodiment, the distribution generation instructions 175 may provide further instruction to ensure that the uniform β regression coefficient value is more appropriate for crop yield prediction by requiring that the β regression coefficient is a negative value because the measured weather indices describe crop stress which, has a negative impact on crop yield.

In an embodiment, depending on whether the distribution generation instructions 175 determined a uniform β regression coefficient or a set of varying $β_s$ regression coefficients, the linear regression instructions 174 determine the yield for the specific geographic area and year provided by the crop yield estimating instructions 173. The determined yield for the specific geographic area is the expected value for the crop yield of the specific geographic area. The linear regression instructions 174 provide instructions to return the expected crop yield value to the crop yield estimating instructions 173. The crop yield estimating instructions 173 provide instruction to repeat this process to determine the yields for all geographic areas that have a covariate matrix using either the uniform β regression coefficient or the set of varying $β_s$ regression coefficients.

3.4. Determining National Crop Yield

At step 530, a national yield is determined for the specific year using the previously determined crop yields for multiple specific geographic areas and accounting for particular national adjustment factors. For example, the crop yield estimating instructions 173 determine the national yield for the specific year using the previously determined crop yields for geographic areas accounting for particular national adjustment factors. The crop yield estimating instructions 173 first sends crop yields for a set of geographic areas to the national yield adjustment instructions 176.

The national yield adjustment instructions 176 determine how much weight each geographic area should be given relative to one another. For example, each geographic area may represent a different corn producing state. If Iowa produces on average twice as much crop than Nebraska, then Iowa's weighted factor would be twice as large as Nebraska's weighted factor. Since each crop yield for a specific geographic area received by the national yield adjustment instructions 176 is a prediction, the national yield adjustment instructions 176 uses three bias coefficients, α, γ, $σ^2$, to account for biases and errors caused by incomplete sampling within the geographic areas. The national yield adjustment instructions 176 then returns weights corresponding to each geographic area and bias coefficients to the crop yield estimating instructions 173. The crop yield estimating instructions 173 then request a normal distribution from the distribution generation instructions 175 where the mean and variance are the sum of the crop yields from the geographic areas accounting for the bias coefficients. The normal distribution function for the national yield is as follows:

$$Y_t \sim^{iid} N(α+γΣ_s w_{t,s}μ_{t,s}, γ^2 Σ_s w_{t,s}^2 σ_s^2 + σ^2)$$

The notation is as follows:

$μ_{t,s}$: equals the expected value of $Y_{t,s}$.

$w_{t,s}$: equals the weighted value given to each geographic area relative to the other geographic areas for that given year.

$σ_s^2$: equals the variance for that specific geographic area.

$Σ_s w_{t,s} μ_{t,s}$: equals the sum of the crop yield expected values for a geographic area multiplied by their respective weights.

α, γ, $σ^2$: are first, second, and third national bias coefficients.

$Σ_s w_{t,s}^2 σ_s^2$: equals the sum of the geographic area specific variance multiplied by their respective weights squared.

After calculating the predicted national crop yield, using the distribution generation instructions 175, the crop yield estimating instructions 173 creates a crop yield estimate for the particular year requested.

In an embodiment, the national crop yield estimate may include a set of values including, but not limited to, a national crop yield value, a prediction interval for the national crop yield value, and a distribution set associated with the predicted national crop yield value. In an embodiment, the crop yield estimating instructions 173 may create a crop yield estimate that includes a set of values associated with either a state or regional level.

The prediction interval associated with the national crop yield is a range calculated by the crop yield estimating instructions 173, which is expected to cover the true national yield value with certain probability. When the probability of covering the true national yield is fixed, the narrower the prediction intervals the more certain the national yield prediction is. For example, crop yield estimating instructions 173 may be configured to calculate a prediction interval that is expected to cover the true national crop yield 90% of the time. In this example, if the predicted national crop yield is 165 bushels per acre and the prediction interval range is a very small range, such as 155-170 bushels per acre, then the certainty associated with the predicted national crop yield is very high because over 90% of the predictions resulted in a very narrow range of values. However, if in the previous example the prediction interval is 120-200 bushels per acre, then the certainty associated with the predicted national crop yield is lower because to achieve the same probability of covering the true national yield a range of 80 bushels per acre is needed instead of 15 bushels per acre. The advantage to receiving an associated prediction interval is that it allows the user to better understand the certainty behind the predicted national crop yield value.

In an embodiment, a distribution set associated with the predicted national crop yield value may be calculated to provide further information of the predicted national crop yield. For instance, by providing the entire distribution set, a user may further calculate risk, revenue, or other predictions based upon the distribution set of yield values.

4. Weather Indices

As introduced above, weather indices are used to quantify extreme events that may cause stress to crop growth and may negatively affect optimal crop yield. Types of weather indices include, but are not limited to, flood stress, drought stress, day heat stress, night heat stress, early drought stress. Each type of weather index described is calculated using observed agricultural data over a specified period. In an embodiment, the specified period used to calculate a weather index may be derived from a crop's lifecycle called the crop phenology.

4.1 Crop Phenology

Figure 7:
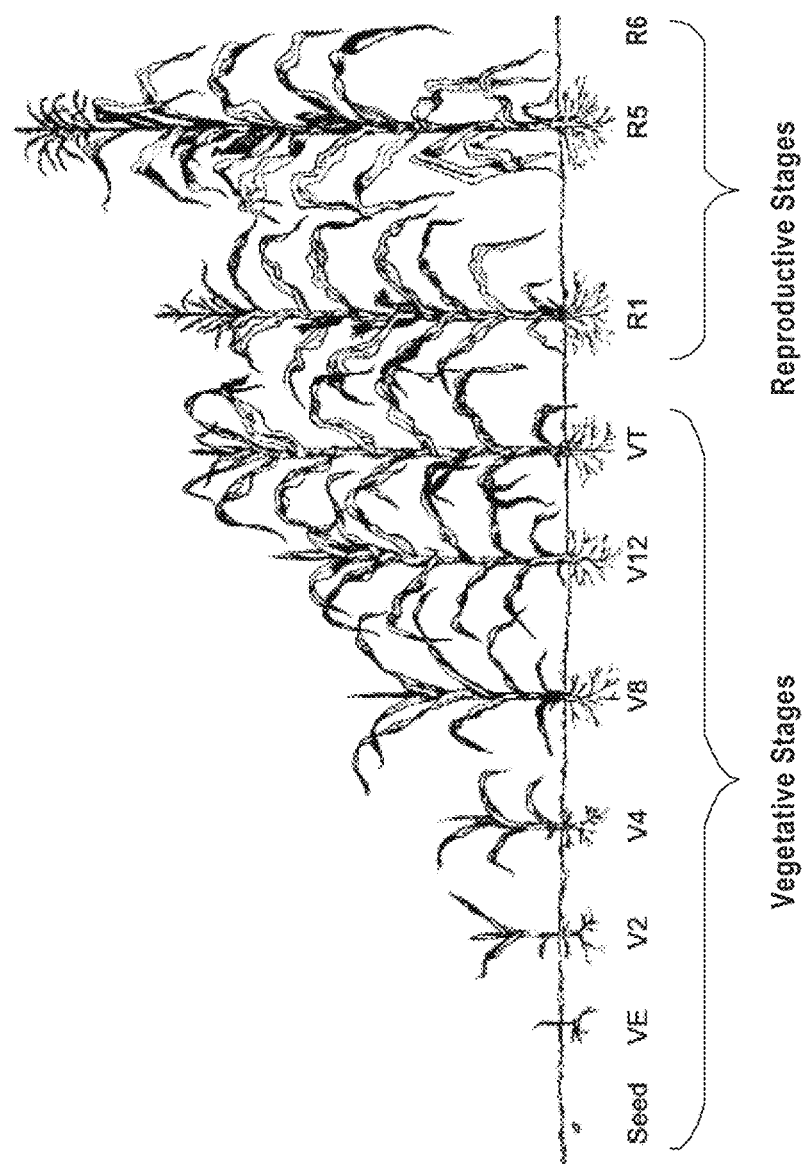
FIG. 7 illustrates an example embodiment of corn growth stages.

The lifecycle of plants is measured using growth development stages starting from seeding to physiological maturity. In corn, the maturity stage is also known as the black layer stage. FIG. 7 illustrates an example embodiment of corn growth stages. Corn growth stages may be divided into two major types of stages, vegetative and reproductive stages. Vegetative growth stages are the stages where the corn plant develops from a seed to a fully formed plant. The vegetative growth stages are characterized by the crop increasing in biomass, developing roots, stalk, and leaves, and preparing itself for reproduction. Vegetative growth stages begin with the corn emergence stage, labelled as "VE", and end with the fully visible tassel stage, "VT". Corn emergence (VE) signifies the first visible site of the corn plant from the ground. Fully visible tassel (VT) signifies the stage where the tassels, pollen producing flowers, are completely visible. Between the VE and VT stages exist multiple vegetative stages typically denoted by numerals and that describe the growth of the corn plant by how many uppermost leaves are visible with the leaf collar. For example, "V2" signifies the growth stage where two leaves are fully expanded with the leaf collar visible, and "V12" signifies the growth stage where twelve leaves are fully expanded with the leaf collar visible.

The reproductive stages describe stages starting from when pollen may be produced to the corn plant's physical maturity. The reproductive stages begin at silking, "R1," and end at physiological maturity, "R6", also known as the black layer stage. Between stages R1 and R6 are stages relating to the corn plant's growth. For example, "R2" is the blister stage at which kernels are typically white and resemble a blister in shape. Stage "R3" is the milk stage, in which kernels are yellow on the outside with milky inner fluid. Stage "R4" is the dough stage, in which the milky inner fluid thickens to a pasty consistency. Stage "R5" is the dent stage, in which kernels show an external physical dent.

The phenology stages of the corn plant may be tracked based upon factors outside the appearance of the individual corn plants. For example, the phenological development of corn plants is strongly related to the accumulation of heat by the plants, which furthers plant growth. The accumulation of heat may be estimated by tracking daily maximum and minimum temperatures in or near the field. In an embodiment, growing degree days (GDD) are used to track the different developmental stages of corn plant growth. GDD may be calculated using different observational data and different thresholds. For example, GDD may be calculated as:

$$Daily\ GDD = \frac{T_{max} + T_{min}}{2} - T_{base}$$

where $$\frac{T_{max} + T_{min}}{2}$$

is the daily average temperature calculated from the daily maximum and minimum temperatures. $T_{base}$ is a lower threshold temperature where no significant corn plant growth occurs. In an embodiment, cutoff values may be set for $T_{max}$ and $T_{min}$. For example, a cutoff value of 86° F. may be set for $T_{max}$ such that $T_{max}$ is set to 86° F. when temperatures exceed 86° F. and a cutoff value of 50° F. may be set for $T_{min}$ such that $T_{min}$ is set to 50° F. when temperatures fall below 50° F.

Therefore when the daily average temperature does not exceed the lower threshold temperature, no growth in the corn plant occurs. FIG. 8 illustrates an example chart where the number of growing degree days are used to define the start and end of different phenological development stages. For example, after 177 GDDs the V2 stage of the corn plant starts. At GDD 1240, the first reproductive stage, R1, begins. While FIG. 9 generally illustrates different phenological development stages for a particular crop, in an embodiment different hybrid seed types may enter phenological stages at different times. For example, the cutoff for the V2 stage of a corn plant with a higher relative maturity value than the one depicted in FIG. 9 may occur after 177 GDDs. Measuring GDDs is particularly useful when determining specific weather indices that correlate to different development stages in corn plant growth.

4.2. Flood Stress

Flooding of fields can be detrimental to growth of corn. For example, standing water may become ponded on top of corn plants causing them to suffer from overwatering and a depletion of oxygen content in the soil. Lack of oxygen in soil may inhibit plants from performing functions such as nutrient and water uptake which will negatively affect the overall crop yield. A flood stress index may be used to quantify the negative effects of observed flooding in order to more accurately predict crop yields. In an embodiment, flood stress is calculated as the sum of the daily water runoff that is above a particular threshold of runoff water. Runoff refers to water not absorbed by the soil that flows above the soil. When measuring runoff, some runoff may be a result of water not being absorbed as fast as the scheduled watering session delivers the water. Therefore only runoff that is above an allowable threshold is considered to be contributing to flood. For example, if the allowable threshold of runoff for a field is configured as 3.75 inches, then any measured runoff above 3.75 inches counts toward the total amount of runoff for calculating flood stress. In an embodiment, stage one flood stress may be calculated as the sum of daily runoff that is above 3.75 over a period from seeding to V8, where stage one covers seeding through V8. In other embodiments, the threshold may be adjusted based upon the soil composition and water absorption rate of the soil.

4.3. Drought Stress

Inadequate soil moisture during growth periods can result in reduced corn yield because nutrient availability, uptake, and transport are impaired without sufficient water in the soil. A drought stress index may be used to quantify the level of inadequate soil moisture over various stages of crop growth. In an embodiment, drought stress is calculated as the sum of daily soil moisture records, from a soil moisture time series, that are below a specified drought threshold. For example, if the specific drought threshold is 20% then all daily soil moisture records that fall below 20% are summed together over the measured growth stages to make up the drought stress weather index. In an embodiment, stage one drought stress is calculated as the sum of all daily soil moisture records between growth stages V8 and V16 where the soil moisture value is below the 20% drought threshold. In other embodiments, drought stress may be calculated as stage two and stage three drought stresses, where stage two covers growth stages from R1 through R2, and stage three covers growth stages from R3 through R5.

In an embodiment, the daily soil moisture records may be derived from soil moisture time series that are specific to a field or geographic area of interest. The soil moisture time series may be generated from a hydrology model, which models the water flow through soil. In an embodiment, the agricultural intelligence computer system 130 may create the hydrology model based upon soil moisture records, such as in Non-Provisional application Ser. No. 14/842,321, the entire contents of which are incorporated by reference as if fully set forth herein.

4.4. Early Drought Stress

As introduced above, inadequate soil moisture during growth periods can result in reduced corn yield, particularly in the early growth stages. In an embodiment, early drought stress may be measured as the sum of the amount of precipitation minus runoff when daily precipitation minus runoff is between zero and 2.5 inches. Precipitation minus runoff equals the amount of water that is absorbed into the soil. By only quantifying water absorbed into the soil when it is below 2.5 inches the early drought stress quantifies when only little water is absorbed. In an embodiment, early drought stress covers the range from planting to V6.

4.5. Daytime Heat Stress

High daytime temperatures can be extremely detrimental to the growth of corn crop. High daytime temperatures, above a certain temperature, may adversely affect corn growth during vegetative and reproductive stages and may negatively affect corn yield. Additionally, extreme daytime temperatures may cause premature drying of soil, which may cause drought. In an embodiment, daytime heat stress may be calculated as the sum of number of degrees Fahrenheit for each day above a defined threshold.

For example, the agricultural intelligence computer system 130 may calculate the daytime heat stress over a period covering stages V10 through V16, where the defined threshold is 93 degrees Fahrenheit. In this example, each of the daily maximum temperatures between growth stages V10 and V16 is evaluated to determine whether any exceed 93 degrees Fahrenheit. If none of the daily maximum temperatures exceed 93 degrees Fahrenheit, then the daytime heat stress during this period would be zero. If however, the daily maximum temperature between growth stages V10 and V16 exceeded 93 degrees twice, both being 100 degrees, then the daytime heat stress would be the sum of (100–93)=7 for both days, equaling a total heat stress of 14 for this period.

In an embodiment, the weather index calculation instructions 171 provide instruction to determine a stage one daytime heat stress, where stage one includes phenology stages from V10 to V16 and a defined threshold temperature at 93 degrees. In an embodiment, the weather index calculation instructions 171 provide instruction to calculate a stage two and stage three daytime heat stress, where stage two covers R1 through R2, and stage three covers R3 through R5, where the defined threshold temperature is 93 degrees Fahrenheit.

4.6. Nighttime Heat Stress

High nighttime temperatures can be detrimental to the growth of corn. High nighttime temperatures may cause corn plants to metabolize sugars at a high rate through the night. This may result in the plant over-consuming sugars for the growth period instead of allotting sugar for the production of kernels. High plant metabolism at night can result in diminished yield because the plant does not have enough resources to produce healthy kernels during the reproduction stage. Nighttime heat stress may be calculated as the sum of number of degrees Fahrenheit for each night above a defined threshold. For example, agricultural intelligence computer system 130 may calculate the nighttime heat stress as the sum of the daily minimum temperatures that are above a minimum temperature threshold of 70 degrees Fahrenheit. In an embodiment, the weather index calculation instructions 171 provide instruction to calculate a stage one nighttime heat stress, where stage one covers R1 through R5 and the minimum threshold temperature is 70 degrees Fahrenheit.

5. Benefits of Certain Embodiments

Using the techniques described herein, a computer can deliver national crop yield that would be otherwise unavailable. For example, the techniques herein can determine, a national crop yield forecast by using observed agricultural data records collected from various fields from a nation. The performance of the agricultural intelligence computing system is improved using the techniques described herein which create accurate models with high computational efficiency, thereby reducing the amount of memory used to model total crop yield across all measured fields within a nation. Additionally, the techniques described herein may be used to create application parameters for an application controller, thereby improving the performance of farming implements controlled by the application controller.

6. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
using weather index calculation instructions in a server computer system, receiving one or more agricultural data records that represent observed agricultural data points for a specific geo-location at a specific time, wherein the observed agricultural data points include at least one of an observed temperature record, soil moisture record, and precipitation record;
using the weather index calculation instructions, calculating weather index values from the one or more agricultural data records to create one or more geo-specific weather indices, wherein each of the geo-specific weather indices includes one or more calculated weather index values for a specific geo-location over a specified period of time;
using weather indices aggregation instructions in the server computer system, aggregating the one or more geo-specific weather indices to create one or more aggregated weather indices that represent specific geographic area, from a subset of the one or more geo-specific weather indices;
using crop yield estimating instructions in the server computer system, selecting representative features from the one or more aggregated weather indices and creating, for each specific geographic area, a covariate matrix in computer memory comprising the representative features selected from the one or more aggregated weather indices;
using the crop yield estimating instructions, determining a geographic area specific crop yield for a specific year by using linear regression instructions to calculate the geographic area specific crop yield from the covariate matrix that represents the specific geographic area for that specific year, wherein one or more regression parameters for the linear regression instructions for the specific geographic area are calculated by using distribution generation instructions and wherein an error term in the linear regression instructions for the specific geographic area is calculated by using the distribution generation instructions, wherein a mean parameter is zero and a variance parameter is a geographic area specific bias coefficient;
using the distribution generation instructions, calculating a mean parameter that is a sum of each geographic area specific crop yield multiplied by a specific weighted value that corresponds to each geographic area, multiplied by a first national bias coefficient, and added to a second national bias coefficient;
using the distribution generation instructions, calculating a variance parameter that is a sum of each bias coefficient for each geographic area, squared, multiplied by the specific weighted values for each geographic area, multiplied by the first national bias coefficient, squared, and added to a third national bias coefficient, squared;
using the crop yield estimating instructions, determining a national crop yield for the specific year by using the mean parameter and the variance parameter calculated by the distribution generation instructions to calculate the national crop yield for the specific year as a sum of the geographic area specific crop yields for the specific year and nationally adjusted using national yield adjustment instructions in the server computer system;
using the server computer system, causing display, on a client computing device that is executing an agricultural application, the national crop yield for the specific year;
using the server computer system, receiving a request, from the client computing device, to modify treatment of one or more fields associated with the specific geo-location;
in response to receiving the request, modifying an operating parameter of an agricultural equipment used for treatment of the one or more fields.

2. The method of claim 1, wherein calculating weather index values from the one or more agricultural data records to create one or more geo-specific weather indices includes calculating a flood stress index as a sum of daily water runoff above a specific threshold value over a specific time period.

3. The method of claim 1, wherein calculating weather index values from the one or more agricultural data records to create one or more geo-specific weather indices includes calculating an early drought stress index as a sum of daily precipitation minus runoff, using daily precipitation not to exceed 2.5 inches (625 mm) over a specific time period.

4. The method of claim 1, wherein calculating weather index values from the one or more agricultural data records to create one or more geo-specific weather indices includes calculating a drought stress index as a sum of a fraction of soil moisture below a specified threshold over a specific time period.

5. The method of claim 1, wherein calculating weather index values from the one or more agricultural data records to create one or more geo-specific weather indices includes calculating a daytime heat stress index as a sum of a number of degrees that a maximum daily temperature is above a specified threshold over a specific time period.

6. The method of claim 1, wherein calculating weather index values from the one or more agricultural data records to create one or more geo-specific weather indices includes calculating a nighttime heat stress index as a sum of a number of degrees that a minimum daily temperature is above a specified threshold over a specific time period.

7. The method of claim 1, wherein selecting the representative features from the one or more aggregated weather indices comprises selecting, for each type of weather index within the one or more aggregated weather indices, one of: a median value for each type of weather index from the aggregated weather indices, or a mean value for each type of weather index from the aggregated weather indices.

8. The method of claim 1, wherein the specific geographic area represents a specific state in a country.

9. The method of claim 1, wherein determining a geographic area specific crop yield for a specific year using linear regression instructions comprises using distribution generation instructions to calculate the one or more regression parameters for the linear regression instructions, wherein the one or more regression parameters are based upon observed agricultural data points from multiple measured geographic areas when the observed agricultural data points are captured on or before a specified observation date.

10. The method of claim 1, wherein determining a geographic area specific crop yield for a specific year using linear regression instructions comprises using distribution generation instructions to calculate the one or more regression parameters for the linear regression instructions, wherein the one or more regression parameters are based upon observed agricultural data points from the specific geographic area when the observed agricultural data points that include observed agricultural data points captured after a specified observation date.

11. The method of claim 1, wherein determining the national crop yield for the specific year by using the distribution generation instructions comprises using independent and identically distributed random variables.

12. The method of claim 1, wherein determining the national crop yield for the specific year further comprises determining a prediction interval associated with the national crop yield, wherein the prediction interval is range of values that measures a level of certainty associated with the national crop yield.

13. The method of claim 1, wherein determining the national crop yield for the specific year further comprises determining a distribution set associated with the national crop yield, wherein the distribution set measures a level of certainty associated with the national crop yield.

14. The method of claim 1, wherein the agricultural equipment comprises at least one of a tractor, planting equipment, tillage equipment, fertilizing equipment, insecticide equipment, harvester equipment, and watering equipment.

15. A data processing system comprising:
a memory;
one or more processors coupled to the memory;
weather index calculation instructions stored in memory, executed by the one or more processors, and configured to cause the one or more processors to receive one or more agricultural data records that represent observed agricultural data points for a specific geo-location at a specific time, wherein the observed agricultural data points include at least one of an observed temperature record, soil moisture record, and precipitation record;
the weather index calculation instructions stored in memory, executed by the one or more processors, and configured to cause the one or more processors to calculate weather index values from the one or more agricultural data records to create one or more geo-specific weather indices, wherein each of the geo-specific weather indices includes one or more calculated weather index values for a specific geo-location over a specified period of time;
weather indices aggregation instructions stored in memory, executed by the one or more processors, and configured to cause the one or more processors to aggregate the one or more geo-specific weather indices to create one or more aggregated weather indices that represent specific geographic area, from a subset of the one or more geo-specific weather indices;
crop yield estimating instructions stored in memory, executed by the one or more processors, and configured to cause the one or more processors to select representative features from the one or more aggregated weather indices and creating, for each specific geographic area, a covariate matrix in computer memory comprising the representative features selected from the one or more aggregated weather indices;
the crop yield estimating instructions stored in memory, executed by the one or more processors, and configured to cause the one or more processors to determine a geographic area specific crop yield for a specific year by using linear regression instructions to calculate the geographic area specific crop yield from the covariate matrix that represents the specific geographic area for that specific year, wherein one or more regression parameters for the linear regression instructions for the specific geographic area are calculated by using distribution generation instructions and wherein an error term in the linear regression instructions for the specific geographic area is calculated by using the distribution generation instructions, wherein a mean parameter is zero and a variance parameter is a geographic area specific bias coefficient;
using the distribution generation instructions stored in memory, executed by the one or more processors, and configured to cause the one or more processors to calculate a mean parameter that is a sum of each geographic area specific crop yield multiplied by a specific weighted value that corresponds to each geographic area, multiplied by a first national bias coefficient, and added to a second national bias coefficient;
using the distribution generation instructions stored in memory, executed by the one or more processors, and configured to cause the one or more processors to calculate a variance parameter that is a sum of each bias coefficient for each geographic area, squared, multiplied by the specific weighted values for each geographic area, multiplied by the first national bias coefficient, squared, and added to a third national bias coefficient, squared;
the crop yield estimating instructions stored in memory, executed by the one or more processors, and configured to cause the one or more processors to determine a national crop yield for the specific year by using the mean parameter and the variance parameter calculated by the distribution generation instructions to calculate the national crop yield for the specific year as a sum of the geographic area specific crop yields for the specific year and nationally adjusted using national yield adjustment instructions stored in memory;
using instructions stored in memory, executed by the one or more processors, and configured to cause display, on a client computing device that is executing an agricultural application, the national crop yield for the specific year;
using the instructions stored in memory, executed by the one or more processors, and configured to receive a request, from the client computing device, to modify treatment of one or more fields associated with the specific geo-location;
using the instructions stored in memory, executed by the one or more processors, and configured to, in response to receiving the request, modify an operating parameter of an agricultural equipment used for treatment of the one or more fields.

16. The data processing system of claim 15, further comprising instructions stored in memory, executed by the one or more processors, and configured to cause calculating weather index values from the one or more agricultural data records to create one or more geo-specific weather indices includes calculating a flood stress index as a sum of daily water runoff above a specific threshold value over a specific time period.

17. The data processing system of claim 15, further comprising instructions stored in memory, executed by the one or more processors, and configured to cause calculating weather index values from the one or more agricultural data records to create one or more geo-specific weather indices includes calculating an early drought stress index as a sum of daily precipitation minus runoff, using daily precipitation not to exceed 2.5 inches (625 mm) over a specific time period.

18. The data processing system of claim 15, further comprising instructions stored in memory, executed by the one or more processors, and configured to cause calculating weather index values from the one or more agricultural data records to create one or more geo-specific weather indices includes calculating a drought stress index as a sum of a fraction of soil moisture below a specified threshold over a specific time period.

19. The data processing system of claim 15, further comprising instructions stored in memory, executed by the one or more processors, and configured to cause calculating weather index values from the one or more agricultural data records to create one or more geo-specific weather indices includes calculating a daytime heat stress index as a sum of a number of degrees that a maximum daily temperature is above a specified threshold over a specific time period.

20. The data processing system of claim 15, further comprising instructions stored in memory, executed by the one or more processors, and configured to cause calculating weather index values from the one or more agricultural data records to create one or more geo-specific weather indices includes calculating a nighttime heat stress index as a sum of a number of degrees that a minimum daily temperature is above a specified threshold over a specific time period.

21. The data processing system of claim 15, further comprising instructions stored in memory, executed by the one or more processors, and configured to cause selecting the representative features from the one or more aggregated weather indices comprises selecting, for each type of weather index within the one or more aggregated weather indices, one of: a median value for each type of weather index from the aggregated weather indices, or a mean value for each type of weather index from the aggregated weather indices.

22. The data processing system of claim 15, further comprising instructions stored in memory, executed by the one or more processors, and configured to cause the specific geographic area represents a specific state in a country.

23. The data processing system of claim 15, further comprising instructions stored in memory, executed by the one or more processors, and configured to cause determining a geographic area specific crop yield for a specific year using linear regression instructions comprises using distribution generation instructions to calculate the one or more regression parameters for the linear regression instructions, wherein the one or more regression parameters are based upon observed agricultural data points from multiple measured geographic areas when the observed agricultural data points are captured on or before a specified observation date.

24. The data processing system of claim 15, further comprising instructions stored in memory, executed by the one or more processors, and configured to cause determining a geographic area specific crop yield for a specific year using linear regression instructions comprises using distribution generation instructions to calculate the one or more regression parameters for the linear regression instructions, wherein the one or more regression parameters are based upon observed agricultural data points from the specific geographic area when the observed agricultural data points that include observed agricultural data points captured after a specified observation date.

25. The data processing system of claim 15, further comprising instructions stored in memory, executed by the one or more processors, and configured to cause determining the national crop yield for the specific year by using the distribution generation instructions comprises using independent and identically distributed random variables.

26. The data processing system of claim 15, further comprising instructions stored in memory, executed by the one or more processors, and configured to cause determining the national crop yield for the specific year further comprises determining a prediction interval associated with the national crop yield, wherein the prediction interval is range of values that measures a level of certainty associated with the national crop yield.

27. The data processing system of claim 15, further comprising instructions stored in memory, executed by the one or more processors, and configured to cause determining the national crop yield for the specific year further comprises determining a distribution set associated with the national crop yield, wherein the distribution set measures a level of certainty associated with the national crop yield.

28. The data processing system of claim 15, wherein the agricultural equipment comprises at least one of a tractor, planting equipment, tillage equipment, fertilizing equipment, insecticide equipment, harvester equipment, and watering equipment.

* * * * *